Patented Aug. 31, 1937

2,091,284

UNITED STATES PATENT OFFICE 2,091,284

METHOD OF CURING FORAGE CROPS

Herman E. Kiefer, Burlington Township, Burlington County, N. J.

No Drawing. Application June 19, 1934, Serial No. 731,321

10 Claims. (Cl. 99—8)

My invention relates to the curing and/or preparation of green forage crops for use as animal food and comprises a two-stage dehydrating treatment of those forage crops which include leaf and stalk or stem portions and in which the stalk or stem portion contains moisture greatly in excess of the moisture contained within the leaf. The feeding value of these forage crops resides largely in their protein content and the leaf portion, containing the higher protein content, is the important portion to conserve.

The best known and probably the most valuable forage crop in the world is alfalfa (*Medicago sativa*), also known as "Lucerne" and, while the method of treatment forming the subject of my invention is not limited to the treatment of any particular forage crop, it is especially adapted for the curing or preparation of alfalfa for use as stock feed.

As is well known, alfalfa is a perennial herb, and among its chief characteristics is the development of a root of extraordinary penetrative power which greatly aids in the collection of moisture, and its ability to yield a succession of herbage growths. Its ability to produce a succession of crops in a single season has established alfalfa throughout the world as one of the best forage crops. The greatest use of alfalfa is in the form of hay which may be subsequently ground for feeding, but it has been found difficult to cure alfalfa in the field if its high feeding value is to be maintained. Moreover, there are other conditions which make field-cured alfalfa less desirable. It has been found that quality in hay as judged by color and smell was always associated with high diastatic activity, and that such hays usually contained a larger amount of soluble digestive constituents. Hill, in his work on "The Culture of Lucerne", Auckland, New Zealand, [1925], refers to the investigations of R. C. Shuey, of Kansas, "Diastatic activity of alfalfa", Journal of Indus. and Eng. Chem. Vol. IV, No. 11, 1914, who said:

"The diastatic activity was increased by darkness and warmth, and was greater in young plants than in old ones. Drying the plant at temperatures above 50° C. in a humid atmosphere decreased the diastatic activity, but if the drying was carried on in a current of air with a gradually increasing temperature, the activity was increased. Consequently in field curing, the light and humidity are detrimental to the making of good hay, more especially if the humidity is increased by rain during the process, whilst curing by artificial heat under proper conditions of ventilation and temperature yielded hay of the very best quality."

The plant structure of alfalfa involves leaves and stems or stalks. The leaves are high in the desirable protein content and low in the undesirable crude fibre, while the stems or stalks are low in protein content and high in fibre. For example, the leaves may run from 18% to 24% or higher in protein, while the stems and stalks run from 6% to 12%, or possibly a little higher. A mixture of field-cured alfalfa and stems and stalks runs between 12% and 15% protein, with a fair average of about 14%. The stalks and stems on a commercially dry basis usually run between 30% and 50% crude fibre, while the leaves accompanying the same usually run between 12% and 15%.

Owing to large surface area and structural characteristics, the leaves of alfalfa part with their water very quickly and curl up, many of them dropping from the stem and/or stalk in the field, with consequent loss of the most valuable part of the feed before going into storage. In like manner, by reason of their structural characteristics, the stems and/or stalks part with their water slowly; hence, in field-cured alfalfa, the leaves are always ready for storage before the stalks and/or stems. If the alfalfa is stored when the leaves only are ready, the high water content in the stems and/or stalks is likely to cause undue fermentation, with danger of spontaneous combustion. In either event, entire spoiling of the crop in the stack or barn ensues.

The tendency of the leaves to fall off the stems and/or stalks is a further disadvantage in feeding, owing to lack of uniformity when rationing alfalfa to stock, sifting of the leaves in storage causing streaks of high feeding value and streaks of low feeding value, as may be readily understood from their chemical compositions. When a dairyman encounters these streaks of poor feeding value, he must either compensate for them by feeding additional grain or other concentrate, or suffer a loss in milk production.

Various methods of artificial curing have been proposed and, while they tend to minimize the loss of leaves in the field, they do not prevent the streaks of variable feeding value in the hay loft unless the whole product is ground or finely chopped.

I have developed a method of artificially curing alfalfa which not only overcomes the irregularities present in the stored hay, but only requires a minimum amount of fuel or power, or fuel and power combined, per unit of finished products.

In carrying out the method or process forming the subject of my invention, I propose to dry the leaves to the desired extent by artificial means and, during this treatment, the alfalfa may be subjected to agitation to defoliate the stems and/or stalks, or the drying operation may be such as to render the leaves in a condition permitting ready defoliation of the stalks and/or stems following the drying of the leaves. To this end, my new and novel treatment for the curing of alfalfa comprises a two-stage system of drying in which the first stage consists in artificially drying sufficiently to make a reasonably dry or commercially dry product of the leaves, and to simultaneously defoliate the stems and/or stalks, or render the latter readily defoliable by mechanical means or manually. The second stage of drying—that is to say, removal of the water left in the stalks and/or stems—which is the expensive part of all present systems of treatment, is effected by other simpler and less expensive methods and need not necessarily be artificial drying.

In carrying out my invention, I may employ suitable drying means which may be of suitable commercial type in which the harvested forage crop, alfalfa, for instance, may be placed and subjected to a temperature that will effect the desired dehydration. This may include the direction of currents of heated air, or heated air and products of combustion, through the plant mass. By preference, the drier is of a type including means that will cause the material treated to be conveyed and agitated whereby separation of the leaves from the stems and stalks during the drying operation may be effected, with separate discharge; the leaves being delivered in a substantially or commercially dry state for grinding and/or storage and the partially dehydrated stems or stalks being delivered in piles for natural dehydration or for dehydration in any other suitable and inexpensive manner.

By my process, the endeavor to remove as much water as measured by present standards from the stems and/or stalks so as to make it safe to store the entire crop in heaps, is a secondary consideration. The primary consideration is to apply just sufficient heat to defoliate the stems and/or stalks or permit them to be readily defoliated and, at the same time, have the leaves sufficiently dry for grinding or storage. I do not aim at complete dehydration of the stalks in the first stage which has seemed necessary in other dehydrating processes, since the excess of water left in them is more economically removed by other means. By following this procedure, I find I can greatly increase the capacity of a dryer when employed to dry the leaves to the desired extent.

I find that, when substantially all of the leaves have been removed from the stalks and/or stems, masses or heaps of the latter do not offer much resistance to the passage of air which, in small heaps, need be the only drying medium. In larger heaps, it may be desirable to blow air through them at atmospheric temperature, or heated air, or air and products of combustion at a higher temperature.

The great economy of my improved method is readily apparent when it is considered that, in alfalfa, for instance, the leaves constitute about one third to one-half of the green plant and that they dehydrate or can be dehydrated very quickly; that the stalks dehydrate more slowly and are more difficult to dehydrate artificially; and that this latter condition greatly reduces the capacity of any apparatus employed for the dehydrating treatment.

I do not wish to confine myself to any type of artificial dryer, but since dehydration of the leaves is the primary consideration, their separation from the stalks at the earliest moment is desirable. While the conveyor type is suitable for my process, the tumbling type is preferred. Each type of structure will be provided with suitable apparatus for readily separating the substantially dried leaves from the less completely dried stalks and/or stems so that the latter may be dehydrated to the desired extent by other and simpler means.

The objective of artificial curing is to prevent the losses of feeding value that may occur in field curing. The inherent feeding value of a plant decreases as the plant matures, as does also the difficulty in curing. While my process contemplates harvesting at the most desirable stage, I do not wish to confine myself to any particular stage, as whatever the feeding value may be at the time the crop is cut, the maximum is retained in the leaves with little, if any, sacrifice in the stalks, by my improved two-stage process of curing.

I do not wish to confine myself to any given temperature of air, or mixture of air and gases of combustion employed for drying purposes, but the higher the temperature that is consistent with a good product, the more rapidly the drying proceeds.

In the preparation of feed for stock from the dehydrated leaves and stems and/or stalks cured in the manner I have proposed, the desired proportions of the leaves and stems and/or stalks chemical analyses indicate should be used to make a feed of desirable characteristics may be taken and ground together, or the leaves and stems and/or stalks may be separately ground and then mixed in the desired proportions.

While I have referred more particularly to the method of curing alfalfa, it will be understood that my improved method of curing is applicable to all forms of forage crops which involve leaf and stem and/or stalk formation and which may be harvested in a green state, all of which is believed to be within the scope of the appended claims.

I claim:

1. A two-stage process of curing green forage crops involving leaf and stem formation, in which the first curing stage comprises a drying step and the simultaneous separation of the leaf from the stem, and in which the second curing stage consists in removing from the stem portion a surplus of water not necessary to remove in the first stage.

2. A two-stage drying process for green forage crops involving leaf and stem formation in which the leaves are dried just sufficiently in the first stage to make a commercial product and are detached from the stems which are partially cured by such drying treatment; the second stage consisting in subsequently and separately drying the stems to the same extent as the leaves.

3. A two-stage process of curing green forage crops involving leaf and stem formation in which the first curing stage consists in curing by drying and simultaneously separating the dried leaves from the partially dried stems, and in which the second curing stage consists in finally drying the stems by suitable means.

4. The method of curing green forage crops which include leaf and stem portions, which consists in harvesting such forage crop in the green state, and separately dehydrating said leaf and stem portions.

5. The method of curing green forage crops which include leaf and stem portions which consists in harvesting such forage crops in the green state; subjecting the harvested crop to combined heat and agitation to effect dissociation of the leaf portions from the stem portions and simultaneously dry the leaf portion, separating the dried leaves from the stem portions; and subsequently drying said stem portions.

6. The preparation of dried animal feed of substantially known protein content from green forage crops involving leaf and stem formation, which consists in harvesting such crops in a green stage of growth; immediately dehydrating the green leaves to a commercial degree in a primary stage of treatment; completing the dehydration of the stems to a similar degree in another stage; grinding the leaves and stems separately and afterward mixing them in the proportions chemical analyses indicate should be used to make products that can always be depended upon to have uniform compositions.

7. The preparation of dried animal feed of substantially known protein content from green forage crops involving leaf and stem formation, which consists in harvesting such forage crops in a green state of growth; separating the leaf portion from the stem portion; separately dehydrating the leaf portion and stem portion of such crop immediately from the green state; determining the protein content of leaf and stem; mixing the same to give a predetermined protein content in the desired feed; and subsequently grinding the mixture of dried leaf and stem portions.

8. The method of preparing alfalfa and similar leaf and stem vegetation for animal feed, which comprises harvesting the same in a green state, subjecting the green crop to heat and agitation whereby the leaf portion thereof is dried and separated from the stem portion, separately drying the stem portion subsequent to said separation, and finally mixing the dried leaf and stem portions in amounts to give a predetermined protein content in the desired feed.

9. The method of preparing alfalfa and similar leaf and stem vegetation for animal feed, which comprises harvesting the same in a green state, subjecting the green crop to agitation and heat whereby the leaf portion thereof is dried and separated from the stem portion, separately drying the stem portion subsequent to said separation, grinding the leaf portion and the stem portion, and finally mixing the leaf and stem portions in required amounts to give a predetermined protein content in the desired feed.

10. A two-stage process of curing green forage crops involving leaf and stem formation with differing degrees of moisture content; one stage comprising heat treatment and agitation to separate leaf and stem; such treatment drying the leaves and partially drying the stem portions, and the second stage consisting in separately and completely drying the stem portion which contains the larger moisture content.

HERMAN E. KIEFER.